(12) United States Patent
Li et al.

(10) Patent No.: US 9,577,912 B2
(45) Date of Patent: *Feb. 21, 2017

(54) IN-PRODUCT MICRO-BLOGGING FOR DESIGN SHARING

(71) Applicant: AUTODESK, Inc, San Rafael, CA (US)

(72) Inventors: Wei H. Li, Toronto (CA); Tovi Grossman, Toronto (CA); Justin Frank Matejka, Etobicoke (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,225

(22) Filed: Feb. 2, 2015

(65) Prior Publication Data
US 2015/0149576 A1 May 28, 2015

Related U.S. Application Data

(63) Continuation of application No. 13/650,070, filed on Oct. 11, 2012, now Pat. No. 8,949,356.

(60) Provisional application No. 61/546,995, filed on Oct. 13, 2011.

(51) Int. Cl.
*G06F 15/177* (2006.01)
*H04L 12/26* (2006.01)
*G06Q 10/10* (2012.01)
*H04L 12/58* (2006.01)
*H04L 29/08* (2006.01)

(52) U.S. Cl.
CPC ............ *H04L 43/14* (2013.01); *G06Q 10/103* (2013.01); *H04L 43/0852* (2013.01); *H04L 51/26* (2013.01); *H04L 67/34* (2013.01)

(58) Field of Classification Search
USPC ....................................... 709/206, 220, 207
See application file for complete search history.

(56) References Cited

U.S. PATENT DOCUMENTS

| | | | | |
|---|---|---|---|---|
| 6,295,353 B1 * | 9/2001 | Flockhart | ............ | H04M 3/5237 379/221.01 |
| 2008/0005319 A1 * | 1/2008 | Anderholm | ............ | G06Q 10/00 709/224 |
| 2008/0208610 A1 * | 8/2008 | Thomas | ................ | G06Q 30/02 705/1.1 |

* cited by examiner

*Primary Examiner* — El Hadji Sall
(74) *Attorney, Agent, or Firm* — Artegis Law Group, LLP

(57) ABSTRACT

One embodiment of the present invention sets forth a technique for generating a status update message. The method involves defining one or more status update criteria and monitoring user activity in a software application for the one or more status update criteria. The method further involves determining, based on the user activity, that the one or more status update criteria have been met and generating, via a processing unit, a status update message. The status update message includes multimedia content related to a project associated with the software application.

20 Claims, 5 Drawing Sheets

US 9,577,912 B2

IN-PRODUCT MICRO-BLOGGING FOR DESIGN SHARING

CROSS-REFERENCE TO RELATED APPLICATIONS

This application is a continuation of U.S. application Ser. No. 13/650,070, filed Oct. 11, 2012, which claims benefit of U.S. Provisional Patent Application Ser. No. 61/546,995, filed Oct. 13, 2011, which is hereby incorporated herein by reference in its entirety.

BACKGROUND OF THE INVENTION

Field of the Invention

The present invention generally relates to computer software and, more specifically, to an approach for in-product micro-blogging for design sharing.

Description of the Related Art

A wide variety of software applications are currently available to end-users, including computer-aided design (CAD) applications, computer graphics applications, animation applications, word processing applications, and computer programming applications, among others. Many of these software applications allow an end-user to interact with the software application via a graphical end-user interface (GUI). Conventional GUIs often provide the end-user with access to a set of tools that can be used to perform various operations within a workspace generated by the software application. For example, a CAD application could provide a set of drawing tools that could be used to create complex designs within a drawing workspace generated by the CAD application. In such a case, each tool in the set of tools would be represented within the GUI with an icon that the end-user could select in order to use the tool.

Despite advances in application designs that allow end-users to more easily operate complex applications, learning how to use such applications can still be problematic. More complex applications, for example, like the CAD application described above, often include thousands of commands or functions from which to choose and many ways for an end-user to combine these functions into workflows. Consequently, with unfamiliar aspects of complex applications, even expert end-users may require assistance.

In an effort to share knowledge and experiences related to using different software applications, end-users sometimes post their designs and related instructional materials on websites, such as discussion forums or blogs. Such websites attempt to provide guidance to other users regarding how to use a particular application tool or simply function to update others on the progress of a specific project on which another user is working. While such technologies enable users to distribute designs and instructional materials to a wide audience, these technologies have several limitations. For example, forum- and blogging-related websites and applications are typically external to the software application from which a user wishes to share content. Consequently, a user must interrupt his or her workflow to manually prepare content to be shared, which can be a laborious task. Due to the loss in productivity associated with sharing content, many users who would otherwise be willing to provide exemplary designs and guidance to others may choose not to do so. Moreover, users who do choose to share content may provide infrequent updates. For instance, tutorials and discussion forum threads are typically posted only after a project or large discreet aspects of a project are complete.

As the foregoing illustrates, there is a need in the art for a more effective way for users to share application content and instructional information with other users.

SUMMARY OF THE INVENTION

One embodiment of the present invention sets forth a method for generating a status update message. The method involves defining one or more status update criteria and monitoring user activity in a software application for the one or more status update criteria. The method further involves determining, based on the user activity, that the one or more status update criteria have been met and generating, via a processing unit, a status update message. The status update message includes multimedia content related to a project associated with the software application.

Further embodiments provide a non-transitory computer-readable medium and a computing device to carry out the method set forth above.

Advantageously, the disclosed technique enables users to more efficiently provide detailed project updates and related multimedia content without significantly disrupting project workflow.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
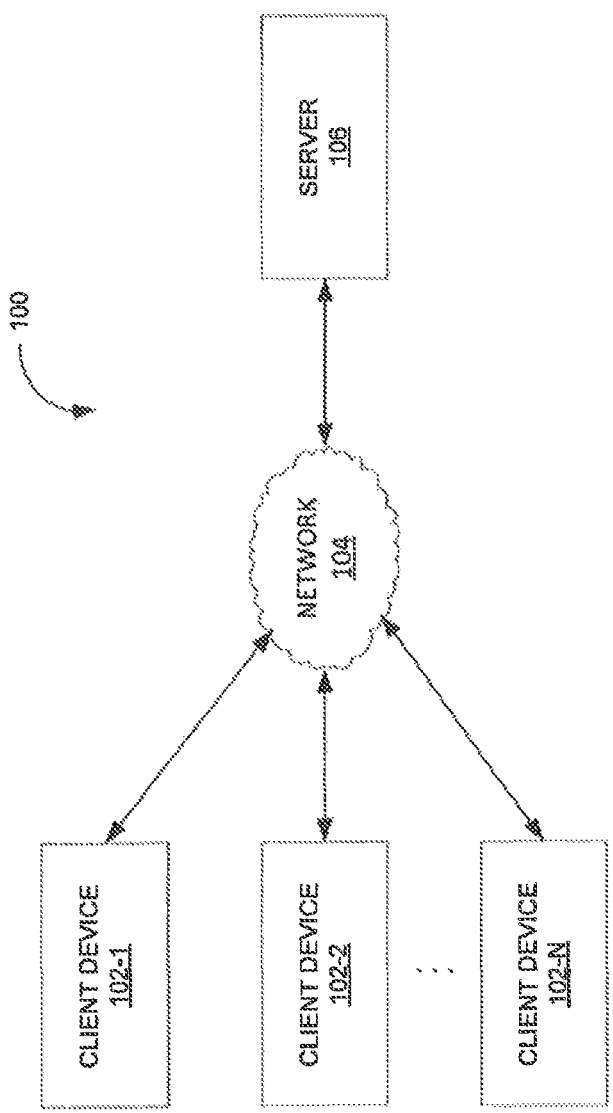
FIG. 1 illustrates a system 100 configured to implement one or more aspects of the present invention.

FIG. 1 illustrates a system 100 configured to implement one or more aspects of the present invention. As shown, the system 100 includes, without limitation, one or more client devices 102 configured to transmit data to and receive data from a server 106 through a network 104. More specifically, as discussed in greater detail below in conjunction with FIG. 2, each client device 102 executes at least one software application and a status update engine. The status update engine monitors one or more different software applications that are executed on a particular client device 102 and determines whether one or more status update criteria have been met. The status update criteria may include time-based or command-based criteria which are defined by a user or generated by a software application. For example, the status update engine may monitor a user's activity to determine whether the user has been executing a software application, or has been performing a particular activity within the application, for a specified duration of time defined by time-based criteria. Additionally, the status update engine may monitor a user's activity to determine whether one or more application commands defined by command-based criteria have been issued by the user. For instance, if the software application were a computer-aided design (CAD) software application, then the status update engine would be configured to monitor the duration of time for which the user has interacted with the CAD software application and/or the different commands issued by the user to generate a design.

Once the status update engine determines that one or more status update criteria have been met, the status update engine generates a status message which includes, for example, a textual description of the user's project, hyperlinks, multimedia content, and/or a command log. The status update engine then transmits the status message to the server 106. The server 106 is configured to accumulate status messages from each client device 102 and store the status messages in one or more databases. The server 106 is further configured to search the database(s) in response to a query submitted by a client device 102 and transmit one or more status messages responsive to the query to the client device 102.

The client device 102 may be any type of electronic device that enables a user to connect to (e.g., via the Internet, a local area network (LAN), an ad hoc network, etc.) and communicate with one or more other users. Exemplary electronic devices include, without limitation, desktop computing devices, portable or hand-held computing devices, laptops, tablets, smartphones, mobile phones, personal digital assistants (PDAs), etc. In one embodiment, at least one client device 102 may be configured to provide the functionality of the server 106, thereby eliminating the necessity of a separate and dedicated server 106. In such an embodiment, the status message database that resides in the server 106, as described below in conjunction with FIG. 2, may instead reside within one or more client devices 102, and the different client devices 102 of FIG. 1 may communicate with and transmit status messages directly to each other, for example, via a peer-to-peer protocol.

Figure 2:
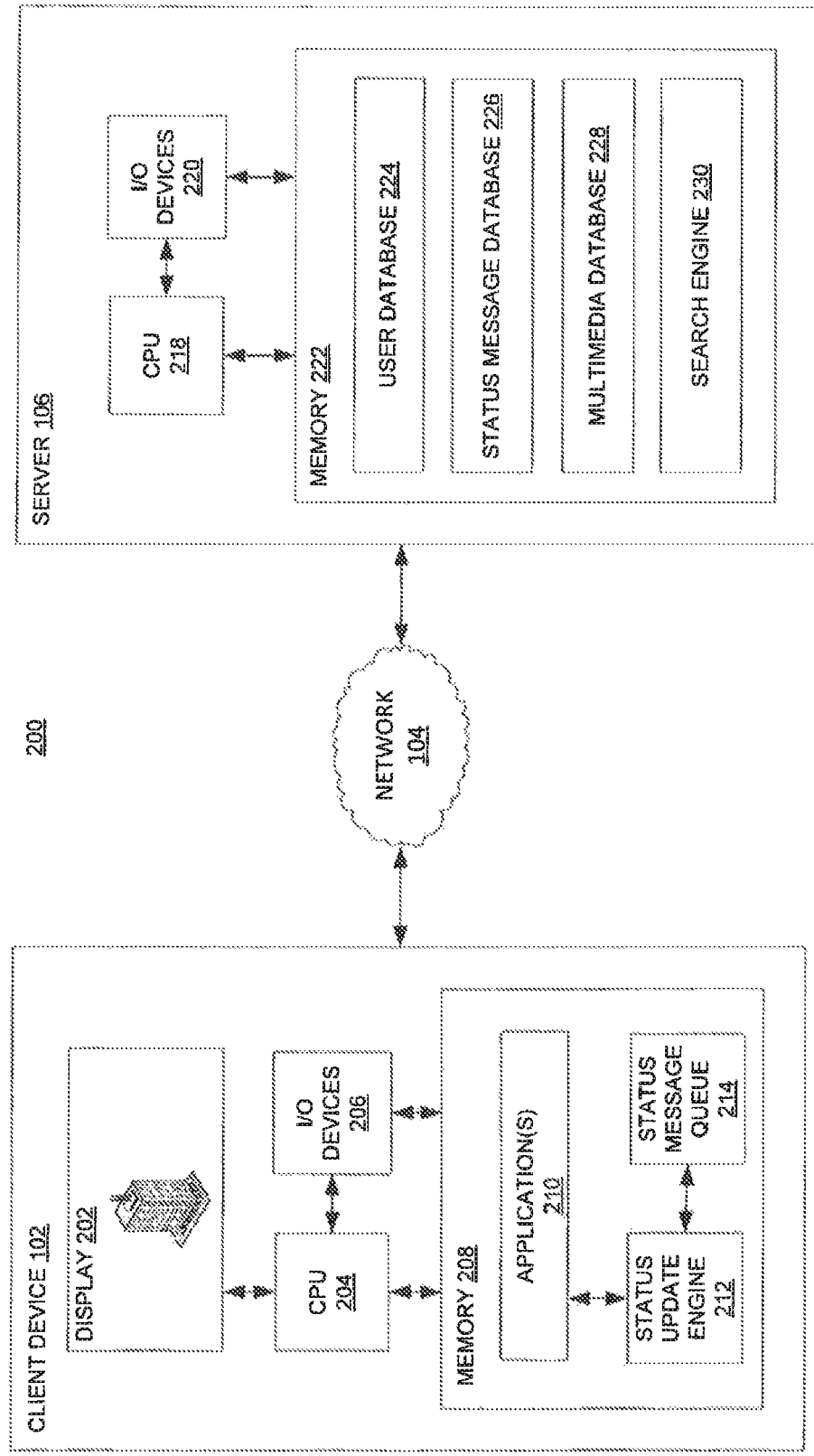
FIG. 2 sets forth more detailed illustrations of one of the client devices and the server of FIG. 1, according to one embodiment of the invention.

FIG. 2 sets forth more detailed illustrations of one of the client devices 102 and the server 106 of FIG. 1, according to one embodiment of the invention. As shown, the client device 102 includes, without limitation, a display 202, a central processing unit (CPU) 204, one or more input/output (I/O) devices 206, and a memory 208. The memory 208 is configured to store software application(s) 210, a status update engine 212, and a status message queue 214. The CPU 204 is configured to execute the software application(s) 210 and the status update engine 212. The software application 210 may be any type of software application. However, in the exemplary embodiment described herein, the software application 210 is a computer-aided design (CAD) application. A user of the CAD application may issue commands through an I/O device 206, for example, in order to prepare or modify design documents associated with the CAD application. The status update engine 212 monitors the commands issued by the user within the CAD application, the duration of time for which the commands are issued, and/or the duration of time for which the CAD application is executed and determines whether one or more status update criteria have been satisfied. Once the status update engine 212 determines that one or more time-based or command-based status update criteria have been satisfied, the status update engine 212 generates a status message.

The status message generated by the status update engine 212 may include, for example, a textual description of the user's project, hyperlinks, metadata, and/or multimedia content. The textual description may include comments prepared by the user describing the project on which he or she is working, or the textual description may be automatically generated by the software application and may include project information, properties, statistics, etc. The textual description may further include one or more hash tags which indicate the topic or relevance of the status message. For example, the hash tag may indicate the project with which the status message is associated. Hyperlinks included in the status message may reference multimedia content such as application screenshots, images, videos, audio, project files (e.g., CAD drawing files), command logs, etc. Additionally, multimedia content may be provided in the status message itself. For instance, an image or video may be embedded in the status message such that a user who views the message does not need to follow a hyperlink to an external platform, website, or database.

A combination of time-based and command-based status update criteria may be used to improve the quality of status messages and decrease the incidence of duplicate or redundant updates. For example, although the use of time-based criteria (in which the status update engine 212 generates a status message at periodic time intervals, e.g., 1 minute, 5 minutes, 1 hours, 2 hours, etc.) is appropriate when a user is continuously working on and updating a project, the use of such criteria may generate redundant status messages when the user is idle and is not actively updating the project. Consequently, time-based criteria may be combined with command-based criteria to provide a better indicator as to when a project has been significantly updated and, thus, when a status message should be generated. In other words, the status update engine 212 may generate a status message only after both the time-based and command-based criteria have been satisfied.

In one example, a status message may be generated when (1) 10 minutes has elapsed since a previous update, and (2) the user has issued the SAVE command. Because users typically issue the SAVE command after a significant amount of work has been performed, this particular combination of time-based and command-based criteria may be a good indicator as to when a status message should be generated. In another example, a status message may be generated when (1) 1 hour has elapsed since the previous update, and (2) the user has issued a threshold number of commands or types of commands. Further, any time interval and command-based criteria which may indicate that a user has performed a significant amount of work may be used.

In order to prevent the status update engine 212 from providing status updates too frequently, prior to transmitting the status message to the server 106, the status update engine 212 may determine whether a status update rate has been exceeded. For example, in the exemplary embodiment described herein, status update messages are transmitted to a social networking platform, where the status messages can be viewed by the user's peers. However, many social networking platforms (e.g., the TWITTER® micro-blogging platform) accept only a certain number of updates from a given user during a given time period. Accordingly, prior to transmitting a status message to the server 106, the status update engine 212 may determine whether a status update rate has been exceeded. If the status update rate has been exceeded, the status update engine 212 transmits the status messages to a status message queue 214, where the status messages are stored until the user's update frequency drops below the permitted status update rate. When the user's update frequency is below the status update rate, the status update engine 212 transmits the status messages through the network 104 to the server 106, where the status messages are stored in one or more of the databases 224, 226, 228. In addition, status messages may be stored in the status message queue 214 when the client device 102 is offline or otherwise unable to communicate with the server 106. Once the client device 102 returns online or otherwise establishes a connection with the server 106, the status messages stored in the status message queue 214 are transmitted to the server 106 and stored in one or more of the databases 224, 226, 228.

Although FIG. 2 shows the status update engine 212 as a separate software module, it is also contemplated that the status update engine 212 may be integrated into the software application 210 or offered as a software add-on or plug-in for the application 210. When configured as a separate software module, the status update engine 212 may be capable of communicating with and receiving information from a variety of different software applications 210.

As also shown, the server 106 includes, without limitation, a central processing unit (CPU) 218, one or more input/output (I/O) devices 220, and a memory 222. The memory 222 is configured to store a user database 224, a status message database 226, a multimedia database 228, and a search engine 230. The CPU 218 is configured to execute the search engine 230, which receives a search query from the status update engine 212 on a client device 102 and searches one or more of the databases 224, 226, 228 for relevant information. A search query may include, for example, a particular user, project, hash tag, type of command, type of project, type of multimedia content, update timestamp, and/or contextual information associated with a user's project and/or workflow. Once the search engine 230 locates one or more status messages responsive to the search query, the search engine 230 transmits the status message(s) to the status update engine 212.

The status update engine 212 processes status messages received from the server 106 to determine, for example, the user and/or project with which the status messages are associated, the type of project, the types of commands, etc. The status messages are then sorted based on these (or similar) criteria and presented in a categorized, timeline, or other visualized fashion to the user of the client device 102, enabling the user to view the progress of a particular project or user, as described in further detail with respect to FIG. 4.

Figure 3:
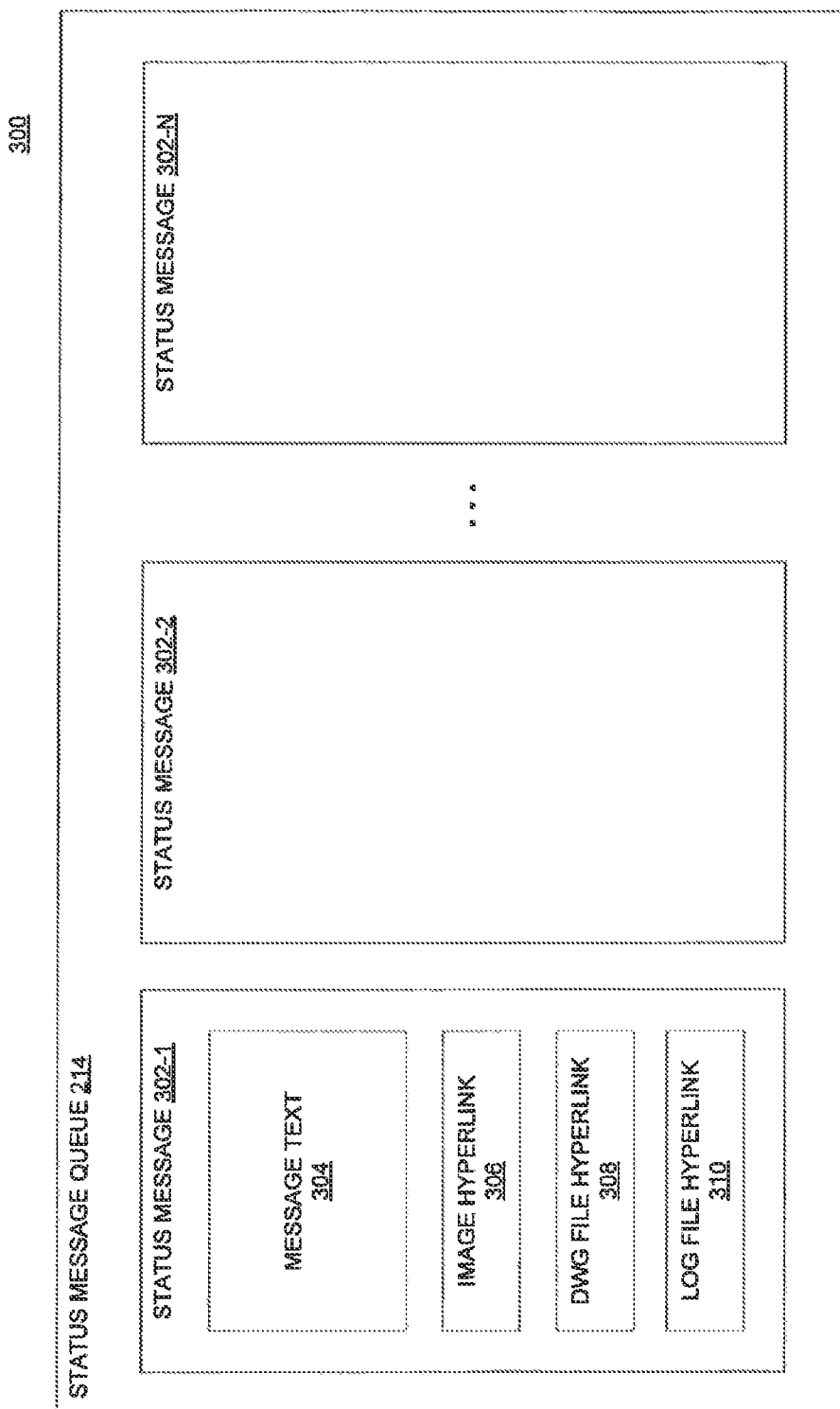
FIG. 3 sets forth a more detailed illustration of an exemplary status message queue of FIG. 2, according to one embodiment of the invention.

FIG. 3 sets forth a more detailed illustration of an exemplary status message queue 214 of FIG. 2, according to one embodiment of the invention. As shown, the status message queue 214 includes one or more status messages 302, each of which is configured to store information related to a particular user or project. For example, activity data element 302-1 includes information such as, without limitation, message text 304, an image hyperlink 306, a drawing (DWG) file hyperlink 308, and a log file hyperlink 310.

As described above with respect to FIG. 2, the message text 304 may include project-related information prepared by the user or automatically generated by the software application and/or one or more hash tags indicating the topic or relevance of the status message. Further, each of the hyperlinks 306, 308, 310 may reference addresses within the server 106, or each of the hyperlinks 306, 308, 310 may reference addresses outside of the server 106. For instance, the image hyperlink 306 may reference any networked image database or server from which a user can download an image file. Similarly, the drawing and log file hyperlinks 308, 310 may reference any networked databases or servers from which a user can download drawing and log files. Hyperlinks included in a status message may be prepared with a uniform resource locator (URL) shortener so that the size of the status message 302 is reduced or to prevent the length of the status message 302 from exceeding a given character limit. Further, in order to keep track of the relationships between status messages 302 and the multimedia content with which they are associated, a unique key may be assigned to each status message 302, and this unique key may be stored in each multimedia file associated with the status message 302 (e.g., stored in the filename of each multimedia file).

Although the exemplary status message 302 illustrated in FIG. 3 includes only text and hyperlinks, it is contemplated that each status message 302 itself may include an image, drawing file, log file, multimedia content, contextual information, or the like, such that a user does not have to follow a hyperlink to view or acquire relevant information. Additionally, any other type of information relevant to the status of a user's project or the status of a software application also may be included in a status message 302.

In an exemplary embodiment, the status update engine 212 may leverage an existing micro-blogging platform and user community, such as the TWITTER® micro-blogging platform. In this embodiment, the status messages 302 generated by the status update engine 212 may include "tweets" which are transmitted to the TWITTER® platform via a web-based application programming interface (API). Each status message 302 may include one or more hash tags indicating the user, project, application, etc. with which the status message 302 is associated. Other users on the TWITTER® platform may then choose to subscribe to (or "follow") the status messages 302 associated with a particular user, project, or application. As an example, a status message 302 associated with the AUTOCAD® software application distributed by AUTODESK® may include the #pj_acd hash tag. Accordingly, when configured to display project updates associated with the AUTOCAD® software package, the status update engine 212 may display status messages 302 including the #pj_acd hash tag. Moreover, upon receiving a status message 302 with a particular hash tag, the status update engine 212 may verify the accessibility and integrity of data or multimedia content contained in the status message 302 or referenced by one or more hyperlinks. Once the status update engine 212 determines that the status message 302 and the content associated therewith are in a valid format, the status update engine 212 may download and display the content of the status message 302, as described in further detail with respect to FIG. 4.

Figure 4:
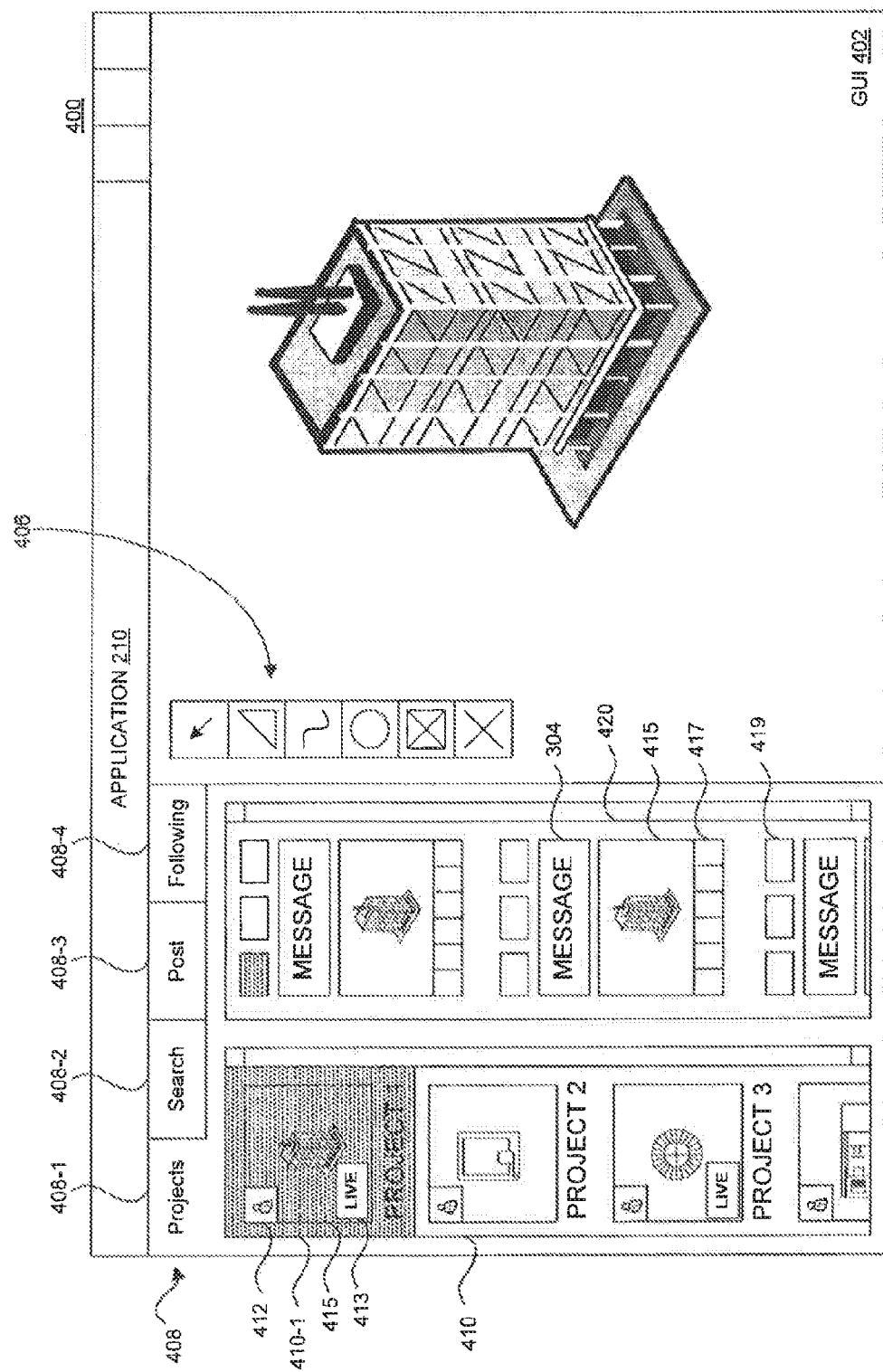
FIG. 4 illustrates a software application executing on one of the client devices of FIG. 2, according to one embodiment of the invention.

FIG. 4 illustrates a software application 210 executing on one of the client devices 102 of FIG. 2, according to one embodiment of the invention. As shown, the software application 210 includes a graphical user interface (GUI) 402, which allows a user to interact with the software application 210. The GUI 402 further enables the user to interact with the status update engine 212 in order to prepare and transmit status update messages, view the progress of a project or user, and search for a particular project or user. Although the status update engine 212 and search engine 230 are described in conjunction with the GUI 402 illustrated in FIG. 4, persons skilled in the art will understand that other implementations of the status update engine 212 and search engine 230 are within the scope of the invention.

When first executing the application 210 and the status update engine 212, a user may create a user account, or a user account may be automatically created for the user. The user account credentials may then be saved and automatically loaded each time the user executes the application 210 and status update engine 212.

As shown in FIG. 4, the GUI 402 allows a user to select from a variety of commands 406 for modifying a document. The GUI 402 also allows the user to select from a variety of functions 408 in order to post status updates as well as view and search for projects and users. For example, the project function 408-1 enables a user to view a listing of projects 410 and a view status message listing 420 associated with each project 410. In one embodiment, a project 410 is defined as one or more messages 302 which provide updates for the same project file. For example, in the exemplary embodiment described with respect to a CAD application, a project 410 is one or more messages 302 which provide updates for the same design file. A user icon 412, indicating one or more users with which the project 410 is associated, and a project preview 415 may be displayed for each project 410 in the listing of projects 410. A status icon 413, indicating that a project is currently being updated and/or that the project creator is currently offering a real-time stream (e.g., a live video stream) of the project, also may be displayed for each project 410. The project preview 415 may include a thumbnail of a project screenshot, or the project preview 415 may be based on a project file associated with the project. For example, the status update engine 212 may retrieve an image or drawing file from the image hyperlink 306 or drawing file hyperlink 308 associated with a status message 302 and generate a project preview 415 from the image or drawing file. Additionally, the listing of projects 410 may specify whether there are any new or unread status messages 302 associated with each project 410.

Once a user selects a particular project 410 from the listing of projects 410, the status messages 302 associated with the project 410 are displayed in the status message listing 420. Each status message 302 shown in the message listing 420 may include a timestamp indicating when the status message 302 was generated or transmitted. In the exemplary embodiment illustrated in FIG. 4, project 410-1 has been selected, and status messages 302 associated with the project 410-1 are displayed in the status message listing 420. Each status message 302 displayed in the status message listing 420 may include, for example, message text 304, relevant commands 417, and/or multimedia content 419. The message text 304 may include project-related information, one or more hash tags indicating the topic or relevance of the status message 302, and/or hyperlinks which reference other textual or multimedia content related to a project 410. The project preview 415, relevant commands 417, and the multimedia content 419 may be associated with one or more hyperlinks 306, 308, 310 provided in the status message 302.

The relevant commands 417 may indicate which commands were issued by the user when preparing the project 410-1. Several implementations of the relevant commands 417 are contemplated. In one implementation, the relevant commands 417 indicate which commands were most frequently executed when preparing the project 410-1, or which commands were most frequently executed since the previous status update. In another implementation, the relevant commands 417 indicate which commands were issued in preparing the project 410-1 and have not previously been issued by the user who is viewing the status message 302. In this implementation, the relevant commands 417 may enable a user to learn more about commands with which he or she is not familiar. In yet another implementation, the relevant commands 417 are specified by the creator of the project 410-1 and may indicate, for example, which commands the project creator considered to be most relevant or useful in preparing the project 410-1. Alternatively, the relevant commands 417 may correspond to commands which the user who is viewing the status message(s) 302 flagged as relevant or useful, for example, with respect to a particular project 410 or with respect to a plurality of projects 410 being followed by the user.

The multimedia content 419 may include icons which a user can select to download or display additional multimedia content 419 associated with the project 410-1 or status message 302. The multimedia content 419 may include content provided by a status message 302, for example, images, screenshots, project files, and the like which allow the user to view aspects of the project 410-1 in further detail. When selected, the multimedia content 419 may be displayed in the application 210 GUI 402, as shown in FIG. 4. Additionally, the multimedia content 419 may include a command log containing a history of commands issued in preparing the project 410-1, detailed project properties, and/or application settings used during the preparation of the project 410-1. In an exemplary embodiment, the listing of projects 410 indicates when the creator of a particular project 410 is currently working on and providing status updates for the project 410. For example, an icon may be displayed over the project thumbnail 415 when the creator is currently providing updates. When a project 410 is currently being updated, the multimedia content 419 may further include an icon which a user can select to view a live stream or video broadcast of the creator's work, for example, via a video broadcast client (e.g., the LiveStream web service). While viewing a live stream, users may be able to communicate in real time with the project creator by commenting on or post questions regarding the project 410.

In the exemplary embodiment, once a project file or screenshot is selected from the multimedia content 419, the project is displayed in the GUI 402. The user is then given an option to specify content-based criteria by selecting one or more regions of the project. After specifying the content-based criteria, the user is notified (e.g., by receiving a status message 302 or notification) whenever the selected region(s) of the project are modified by the project creator. For example, a user may select a particular region of interest in a CAD design by drawing a circle, box, cube, sphere, volume, outline, etc. around a region of the CAD design. Thereafter, the user may receive a status message 302 whenever the project creator transmits a status message 302 which indicates that the region of interest has been modified in the CAD application. Further, the region(s) of interest may include one or more two-dimensional areas and/or one or more three-dimensional volumes.

The search function 408-2 enables a user to search for other users and projects to follow. Searches can be performed by specifying a keyword and/or by specifying application-related criteria. For example, a user may perform a search for a project 410 in which specific commands have been used. In response, the search function 408-2 window may display projects 410 or status messages 302 which specify those command(s) or which include command logs indicating that those command(s) have been performed. Further, search results may be updated in real time or substantially real time to include new projects 410, users, or status messages which meet the search criteria. From the search function 408-2 window, a user can select one or more projects 410 or users to follow.

The post function 408-3 allows the user to compose and/or transmit status messages 302. The post function 408-3 may include a listing of status messages 302 which have been automatically or semi-automatically generated by the status update engine 212 based on one or more time-based or command-based criteria but which have not yet been transmitted to the server 106. The user may review the listing of generated status messages 302 and decide whether to transmit, modify, or delete each status message 302. For example, the user may modify the text of a status message 302 and/or determine what type(s) of data or multimedia content to attach to each status message 302. By default, a timestamp and a screenshot of the project 410 (taken at the time indicated in the timestamp) may be included in each generated status message 302.

In one embodiment, when composing a new status message 302, the user is presented with a dialog box which prompts the user to enter a short description of the project 410. The user is further presented with options to attach multiple data formats, for example, project screenshots, the project file itself, or a log including project history (e.g., command history). The dialog box may include different methods by which the user can quickly and easily include a screenshot. For example, one method may enable the user to draw a box around an area of the screen for which the user wishes to create a screenshot. Other methods may include options to include only certain application 210 windows in a screenshot (e.g., the design window, command toolbars, etc.) in order to avoid sharing sensitive or confidential information with other users.

The "following" function 408-4 displays information related to the users and/or projects 410 to which the user of the application 210 has subscribed. For instance, when a first user of application 210 selects a second user to follow, the following function 408-4 may display each of the second user's projects 410, allowing the first user to select which projects 410 he or she would like to follow. The following function 408-4 further allows the first user to unsubscribe from users or projects 410 to which he or she has been subscribed.

Figure 5:
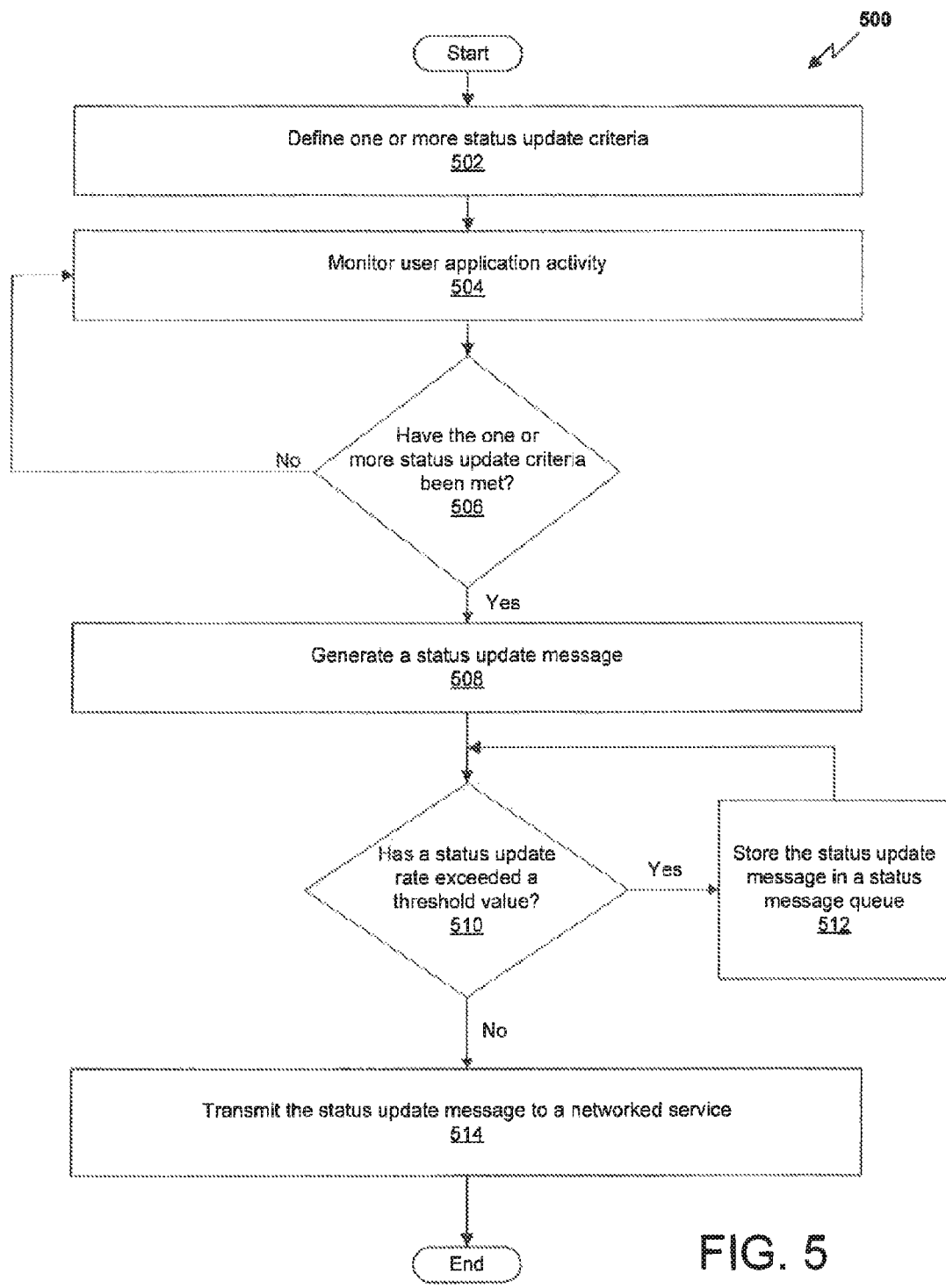
FIG. 5 is a flow diagram of method steps for generating and transmitting a status update message, according to one embodiment of the present invention.

FIG. 5 is a flow diagram of method steps for generating and transmitting a status update message 302, according to one embodiment of the present invention. Although the method steps are described in conjunction with FIGS. 1-4, persons skilled in the art will understand that any system configured to perform the method steps, in any order, falls within the scope of the present invention.

As shown, a method 500 begins at step 502, where one or more status update criteria are defined and provided to the status update engine 212. The status update criteria may be defined by the user or generated by the status update engine 212. As discussed above, the status update criteria may include time-based and/or command-based criteria. At step 504, status update engine 212 monitors the application activity of the user for the one or more status update criteria. At step 506, the status update engine 212 determines whether the status update criteria have been met. If the status update criteria have not been met, the method 500 returns to step 504, and the status update engine 212 continues to monitor the application activity of the user. If the status update criteria have been met, the status update engine 212 generates a status message 302 at step 508.

Next, at step 510, the status update engine 212 determines whether a status update rate has exceeded a threshold value. For example, the threshold value may be defined as an approximate rate above which a micro-blogging platform (e.g., TWITTER®) to which the status messages 302 are sent will reject the messages or otherwise restrict access to the micro-blogging account. If the status update rate has exceeded the threshold value, the status message 302 is stored in the status message queue 214 at step 512. The method 500 then returns to step 510 and determines whether the status update rate continues to exceed the threshold value. If the status update rate does not exceed the threshold value, the status message 302 is transmitted to the server 106. The server 106 may be associated with a social networking service, messaging service, micro-blogging service, or the like, at step 514. Although three exemplary network services have been provided, it is contemplated that the status message 302 may be transmitted to any network service which enables users to communicate and share multimedia information. Further, transmission of the status message 302 may take place by any means of communication, such as over a network (e.g., the Internet, a local area network (LAN), etc.) or through a peer-to-peer or ad hoc connection.

As discussed above in conjunction with FIG. 1, one or more of the client devices 102 may perform the functions of the server 106, thereby eliminating the need for a separate and dedicated server 106. In such an embodiment, the status message 302 may be transmitted from a first client device 102-1 to a second client device 102-2 which is acting as a server and which includes a database (e.g., 224, 226 and/or 228) and/or search engine 230. In yet another embodiment, the status update engine 212, the databases 224, 226, 228, and/or the search engine 230 may be implemented in a cloud computing-type of configuration. In such a configuration, the client devices 102 may act as terminal devices, and the server 106 may execute both the status update engine 212 and the search engine 230. One or more status update engines 212 may monitor the application activity of one or more users and transmit the resulting status messages 302 to the databases 224, 226, 228, which may reside on the same server 106 as the status update engine 212 or on a different server 106 than the status update engine 212.

In sum, a status update engine monitors a user's application activity and determines whether one or more status update criteria have been satisfied. Once the status update criteria have been satisfied, the status update engine generates a status message which includes application information such as, for example, hyperlinks, multimedia content, a screenshot, and/or a command log. The status update engine then transmits the status message to a status message queue or to a database in the server, wherein the status message can be viewed by other users.

One advantage of the techniques described herein is that the user of an application is able to provide project updates to peers simply by defining time-based or event-based criteria which, when met by the application, trigger the automatic creation of a status message. Status messages may include, for example, multimedia content such as images, video, command lists, hyperlinks, and/or project files. Further, by lowering the transaction costs associated with drafting and submitting status messages, the user can provide project updates to other users without interrupting his or her workflow.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for generating a status update message, the method comprising:
    monitoring software application activity to determine whether a status update criterion has been met, wherein the status update criterion indicates that one or more commands have been entered in conjunction with a first attribute of the software application; and
    in response to the status update criterion being met, transmitting a status update message indicating that the update criterion has been met, wherein the status update message comprises information related to the software application.

2. The method of claim 1, wherein the status update criterion comprises a duration of time.

3. The method of claim 1, wherein the status update criterion comprises at least one of a duration of time and at least one application command.

4. The method of claim 1, wherein the information comprises at least one of an application command log, a hyperlink, a video, and a screenshot of the software application.

5. The method of claim 1, wherein transmitting the status update message comprises transmitting the status update message to a network service.

6. The method of claim 1, further comprising:
    determining that a status update rate has exceeded a threshold value; and
    transmitting the status update message to a status message queue.

7. The method of claim 6, further comprising:
    determining that the status update rate has fallen below the threshold value;
    retrieving the status update message from the status message queue; and
    transmitting the status update message to a network service.

8. The method of claim 1, further comprising:
    receiving one or more content-based update criteria, the content-based update criteria specifying one or more regions of interest in the project;
    determining that one or more regions of interest have been modified relative to a previous status update message; and
    displaying the status update message.

9. A non-transitory computer-readable storage medium including instructions that, when executed by a processor, causes the processor to generating a status update message, by performing the steps of:
    monitoring software application activity to determine whether a status update criterion has been met, wherein the status update criterion indicates that one or more commands have been entered in conjunction with a first attribute of the software application; and
    in response to the status update criterion being met, transmitting a status update message indicating that the update criterion has been met.

10. The non-transitory computer-readable storage medium of claim 9, wherein the status update criterion comprises a duration of time.

11. The non-transitory computer-readable storage medium of claim 9, wherein the status update criterion comprises at least one of a duration of time and at least one application command.

12. The non-transitory computer-readable storage medium of claim 9, wherein the information comprises at least one of an application command log, a hyperlink, a video, and a screenshot of the software application.

13. The non-transitory computer-readable storage medium of claim 9, further comprising transmitting the status update message to a network service.

14. The non-transitory computer-readable storage medium of claim 9, further comprising:
    determining that a status update rate has exceeded a threshold value; and
    transmitting the status update message to a status message queue.

15. The non-transitory computer-readable storage medium of claim 14, further comprising:
    determining that the status update rate has fallen below the threshold value;
    retrieving the status update message from the status message queue; and
    transmitting the status update message to a network service.

16. The non-transitory computer-readable storage medium of claim 9, further comprising:
    receiving one or more content-based update criteria, the content-based update criteria specifying one or more regions of interest in the project;
    determining that one or more regions of interest have been modified relative to a previous status update message; and
    displaying the status update message.

17. A computing device, comprising:
    a memory; and
    a processor coupled to the memory, configured to:
        monitor software application activity to determine whether a status update criterion has been met, wherein the status update criterion indicates that one or more commands have been entered in conjunction with a first attribute of the software application; and
        in response to the status update criterion being met, transmit a status update message indicating that the update criterion has been met, wherein the status update message comprises information related to the software application.

18. The computing device of claim 17, wherein the memory includes instructions that, when executed by the processor, cause the processor to define, monitor, and transmit.

19. The computer-implemented method of claim 1, wherein the first attribute of the software application comprises an interval of time within which the one or more commands are entered.

20. The computer-implemented method of claim 1, wherein the first attribute of the software application comprises a region of a three-dimensional model that is modified by the one or more commands.

* * * * *